3,142,151
HYDROGEN PEROXIDE DECOMPOSITION

Richard M. Roberts, Berkeley, and Geza S. Ronay, Oakland, and Frederick M. Fowkes, Orinda, Calif., assignors to Shell Oil Company, a corporation of Delaware
No Drawing. Filed Sept. 24, 1959, Ser. No. 843,033
15 Claims. (Cl. 60—35.4)

This invention relates to the catalytic decomposition of hydrogen peroxide and particularly to an improved method for decomposing hydrogen peroxide by contact with a solid catalyst.

Catalytic decomposition of hydrogen peroxide is carried out for a variety of different purposes. It is especially important to have a rapid and efficient method of hydrogen peroxide decomposition for use in those types of liquid fuel rocket motors in which the liquid hydrogen peroxide is used as a regenerative coolant for the combustion chamber before being catalytically decomposed to form oxygen and steam which are fed to a combustion zone for reaction with the fuel. In this, and other types of rocket motors dependent upon hydrogen peroxide decomposition, the decomposition is effected by passing the peroxide, most usually hydrogen peroxide of about 90% concentration, through a fixed bed of catalyst. Metallic silver-containng catalysts have been found to be especially suitable but a wide variety of other solid catalysts are known to promote the decomposition of hydrogen peroxide and can be used in the process. Prompt start of efficient peroxide decomposition is very important since the entire success of a rocket flight is dependent upon attaining the required velocity with a predetermined amount of peroxide and fuel which must be kept at a minimum because of weight considerations.

An important object of this invention is the provision of an efficient method for promoting the decomposition of hydrogen peroxide on contact with a solid silver catalyst. A special object is to provide a method for increasing the specific hydrogen peroxide decomposition rate so that low temperature starting of catalytic peroxide decomposers is improved. Another object is the provision of a new hydrogen peroxide composition containing a promoter of hydrogen peroxide decomposition which is especially useful as an oxidant in liquid fuel rocket motors using silver catalysts. Still another object is to provide an improved method of decomposing waste peroxide so as to facilitate its disposal safely and economically. Further objects and advantages of the invention will be apparent from the following description of some of its advantageous applications which are intended to be illustrative only and not restrictive of the invention in its broader aspects.

It has been found that the presence in the hydrogen peroxide being decomposed of a soluble polar-substituted highly fluorinated organic compound will greatly increase the rate of decomposition of the peroxide in contact with silver catalysts. Thus, for example, when using silver wire as catalyst with 90% hydrogen peroxide at 32° F., addition of about 0.075 grams of amonium perfluorocaprylate per liter of the peroxide results in a decomposition rate which is some 50 times as fast as the rate of decomposition in the absence of this perfluoro salt.

In accordance with the invention the decomposition of hydrogen peroxide, whether for the generation of oxygen and steam for oxidant or other use or for hydrogen peroxide disposal, is carried out by contacting the hydrogen peroxide with a metallic silver-containing peroxide decomposition catalyst in the presence of a polar compound which is soluble in the hydrogen peroxide and has a fluorinated hydrocarbon chain of at least 4 carbon atoms in which at least 85% of the hydrogen atoms have been replaced by fluorine or chlorine, the ratio of fluorine to chlorine atoms being not less than 3, of a mixture of two or more such compounds. Hydrogen peroxide containing this special type of soluble polar highly fluorinated organic compound is a particularly advantageous novel oxidant which is a special feature of the invention.

The polar highly fluorinated organic compounds used in the invention are those which have a dipole moment equal to at least one Debye unit and which are soluble in the hydrogen peroxide being decomposed to the extent of at least about $7 \times 10^{-5}$ moles per liter. Especially advantageous polar compounds for use in the process and new compositions of the invention because of their unusual stability in peroxide solutions and great effectiveness as decomposition promoters are the perfluoro- and monohydroperfluorocarboxylic acids and their salts. Perfluoroalkanoic acids having 5 to 18 carbons atoms per molecule and their soluble salts are especially advantageous additives for hydrogen peroxide in accordance with the invention. Typical examples of such suitable acids are perfluorovaleric acid, perfluoroisovaleric acid, perfluorocaproic acid, perfluoromethylpropylacetic acid, perfluoroheptanoic acid, perfluorocapric acid, perfluorolauric acid, perfluorostearic acid, and the like, or instead of monocarboxylic acids, perfluoropolycarboxylic acids having a perfluoro alkyl group of at least 5 carbon atoms such, for instance, as perfluoropentylmalonic acid, monohydroperfluorooctylmalonic acid, perfluorodecylsuccinic acid, and the like.

Suitable monohydroperfluorocarboxylic acids are those corresponding to the foregoing perfluorocarboxylic acids in which one of the fluorine atoms linked to a carbon atom has been replaced by a hydrogen atom. Especially useful acids of this subgroup are the omega-hydroperfluoroalkanoic acids. Omega-hydroperfluorovaleric acid, omega-hydroperfluorocaproic acid, omega-hydroperfluoroheptanoic acid, omega-hydroperfluorocaprylic acid, omega-hydroperfluorocapric acid and the like are examples of acids of this kind which can be used as such or in the form of their soluble salts. United States Patent 2,559,629 describes one method for making acids of this group having the formula $H(CF_2CF_2)_nCOOH$ where $n$ is an integer from 3 to 10 which can be successfully employed in the present invention.

Among the salts of the foregoing acids which can be used in place of or together with the described perfluoro- and monohydroperfluorocarboxylic acids, are, for example, the alkali metal, ammonium, alkaline earth metal, zinc, tin and aluminum salts. Salts of monovalent cations, such, for instance, as the sodium, potassium, and ammonium salts of the perfluorocarboxylic and monohydroperfluorocarboxylic acid are especially advantageous because of their favorable solubility and effectiveness as hydrogen peroxide decomposition promoters. Thus, a particularly useful subgroup of additives for use in the invention are those which can be represented by the formula

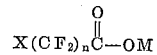

wherein X represents hydrogen or fluorine, M is a member of the group consisting of hydrogen, ammonium and metal cations, preferably cations of monovalent metals or ammonium, and $n$ is a positive integer of at least 4, advantageously 4 to 17. In order to simplify further discussion of the invention the perfluoro- and monohydroperfluorocarboxylic acids and their salts which are used as additives will be referred to generically as perfluorocarboxylic acid compounds.

Instead of perfluorocarboxylic acids or mono-hydroperfluorocarboxylic acids or their salts one can use the corresponding acid anhydrides, acid halides and acid amides. For instance, perfluorovaleric acid anhydride, the mixed anhydride of difluoroacetic and omega-hydroperfluoro-caproic acids, perfluorocaproic acid fluoride, perfluoro-lauric acid amide and omega-hydroperfluoromyristamide, and the like are suitable for use in the process and compositions of the invention in place of or together with other polar perfluoro and/or monoperfluoro additives for the hydrogen peroxide.

Another subgroup of decomposition promoters useful in carrying out the invention, is the perfluoro- and monohydroperfluoro-carbinols. Typical alcohols of this kind which can be used successfully are α,α-dihydroperfluoro-hexyl alcohol; α,α-dihydroperfluoroisooctyl alcohol, α,α-dihydroperfluoro-n-decyl alcohol; α,α,Ω-trihydroperfluoro-tridecyl alcohol and 1,1,10-trihydroperfluorosteryl alcohol and the like. Useful monohydroperfluoro carbinols for use in the process and compositions of the invention are described in U.S. 2,559,628 which also describes a suitable method for producing other members of this subgroup of effective accelerators for the decomposition of hydrogen peroxide in the presence of silver catalysts. The corresponding amines are still another useful subgroup of polar perfluoro compounds which are effective promoters for the silver-catalyzed decomposition of hydrogen peroxide. Satisfactory soluble perfluoro- and monohydroperfluoro-amines and quaternary ammonium halides for use in the invention include perfluorohexyl amine, perfluoroethylperfluorooctyl amine, diperfluoro-amyl amine, 7-monohydroperfluoroheptyl amine, di(tri-fluoromethyl) 11-monohydroperfluoro-undecyl amine, tri-(trifluoromethyl) perfluoropentadecyl ammonium fluoride and triperfluoro amyl ammonium chloride.

One can also use as promoters compounds corresponding to the foregoing in which up to 25% of the fluorine atoms have been replaced by chlorine. Especially useful compounds of this type are, for example, those of the formula X—(CF$_2$—CFCl)$_n$—Y wherein X is hydrogen or fluorine, Y is a polar group, preferably hydroxyl, hydroxymethyl, carboxyl in the free acid or more advantageously in the salt form, amino, amido or the like, and $n$ is a whole number from 2 to 8.

The metallic silver-containing catalysts used for contact with the highly fluorinated polar compound-containing hydrogen peroxide in effecting the decomposition, can be used in any of the customary forms. United States Patent 2,865,721, for example, describes suitable catalyst bed assemblies containing silver catalysts which can be used in the present process.

The way in which the decomposition is carried out can be varied in accordance with convenience in the disposition which is to be made of the decomposition products which will usually be gaseous oxygen and water or steam. As a rule it has been found most advantageous to dissolve the highly fluorinated polar compound in the hydrogen peroxide to be decomposed and then contact the solution with the solid silver catalyst for peroxide decomposition. However, it is also possible to simultaneously contact the hydrogen peroxide and highly fluorinated polar compound with the silver catalyst. The catalyst will usually be employed in the form of a bed of solid catalyst substantially insoluble in the peroxide. However, one can also use a dispersion of silver decomposition catalyst in the hydrogen peroxide to be decomposed.

The mechanism whereby the unexpected improvement in hydrogen peroxide decomposition is brought about by the added highly fluorinated polar compound is not fully understood. These compounds are substantially inert to concentrated hydrogen peroxide, except to the extent that they may be converted more or less completely to the corresponding peracids or salts. But whatever their mode of action these compounds have a pronounced accelerating effect on the overall rate of decomposition of hydrogen peroxide with silver catalyst but do not promote hydrogen peroxide decomposition under normal conditions of shipment and storage.

In normal operation of a solid catalyst bed, such as a silver catalyst bed, four different reaction zones can be distinguished as the hydrogen peroxides being decomposed, flows through the bed. In the zone of initial contact of the hydrogen peroxide with the catalyst, the rate of peroxide decomposition is lowest being dependent on the surface characteristics of the particular catalyst. The heat of hydrogen peroxide decomposition in this zone is transferred rapidly to the peroxide solution by convection so the catalyst surface temperature is only a few degrees above the bulk temperature of the solution. In this first reaction zone the catalyst temperature rises gradually in the direction of flow of the hydrogen peroxide and then increases abruptly at the boundary between the first zone and a second zone in which the catalyst surface temperature is very close to, or the same as, the boiling temperature of the hydrogen peroxide at the existing pressure. In this zone liquid hydrogen peroxide in contact with the catalyst prevents the latter from attaining a higher temperature. This second zone is thus one in which nucleate boiling of the peroxide takes place. The nucleate boiling zone changes into a third zone as the temperature of the peroxide solution continues to rise. This is a zone in which the bulk temperature of the peroxide is so high that liquid contact with the catalyst can no longer transfer all the heat evolved. Consequently, a vapor film forms around the catalyst and film boiling takes place. The rate of peroxide decomposition decreases and the temperature of the catalyst surface increases considerably above the boiling point of the hydrogen peroxide. The temperature of the peroxide finally reaches that at which homogeneous decomposition of both liquid and vapor proceed rapidly in addition to the heterogeneous decomposition which takes place on the container surfaces as well as the catalyst. This is the fourth and final reaction zone in which the decomposition is completed.

The kinetics of the reaction in the first zone largely determine the starting characteristics of the hydrogen peroxide in a given rocket motor catalyst bed. The present invention is based in part on the discovery that the previously described highly fluorinated polar compounds have the unexpected property of markedly increasing the hydrogen peroxide decomposition rate, especially in the first or low temperature reaction zone of a solid catalyst bed. This is brought about as a result of the shifting of the nucleate boiling zone to a lower bulk temperature of the peroxide by the added perfluoro compound. The control of decomposition rate thus made possible is especially advantageous in improving low temperature starting of rocket motors for instance. It has been known for some time that when the bulk temperature of the hydrogen peroxide is reduced to about 40° F. or lower, it becomes very difficult to obtain a satisfactory start with a practical catalytic decomposer. The method and compositions of the invention, however, make quicker and surer starting feasible, regardless of outside temperature conditions, for example. This is not only important at the time of initial rocket firing but even more so where intermittent operation during flight is being relied upon for trajectory corrections or speed decrease during target approach or re-entry of the atmosphere or like maneuvers since the extremely low temperature which may be encountered under these conditions can very seriously interfere with reliable restarting when it is absolutely essential for success.

While the advantage of carrying out the catalyzed decomposition of hydrogen peroxide in the presence of a highly fluorinated polar compound or compounds is usually greatest because of the improvement in startup on contact with a solid decomposition catalyst, these additives shift all the reaction zones to lower bulk hydrogen peroxide temperatures and thus provide further advantage in the control of hydrogen peroxide decomposition.

Comparative tests show the advantage of perfluorocarboxylic acid as an additive in the decomposition of hydrogen peroxide in the presence of a silver catalyst. The tests were made in a static system maintained at constant temperature and essentially constant hydrogen peroxide concentration. For the tests at low temperature, a 125 ml. Erlenmeyer flask in a well-stirred cooling bath was charged with 100 ml. of 90% electrolytic hydrogen peroxide and silver wire of 0.014 inch diameter, which had been cleaned in 90% $H_2O_2$, was used as catalyst. The oxygen evolved during a standard period of 4000 seconds was measured. The following are the results of tests without an additive and with various amounts of a mixture of ammonium salts of perfluoroaliphatic carboxylic acids, principally ammonium perfluorocaprylate.

| Example No. | Temperature °F. | Ammonium perfluoroalkanoate concentration (grams per liter of peroxide solution) | Amount of catalyst (grams per 100 grams of $H_2O_2$) | Oxygen evolution, liters per 100 grams $H_2O_2$ after— | | | | Mean oxygen evolution Rate (cc. per sec. per gram catalyst) |
|---|---|---|---|---|---|---|---|---|
| | | | | 1,000 sec. | 2,000 sec. | 3,000 sec. | 4,000 sec. | |
| I | 30 | None | 0.0266 | 0.15 | 0.30 | 0.42 | 0.52 | 4.86 |
| II | 36–39 | 0.05 | .0179 | 1.4 | 2.95 | 4.7 | 7.0 | 99.1 |
| III | 36 | .15 | .0152 | 1.4 | 3.0 | 4.75 | 6.9 | 113 |
| IV | 42 | .075 | .0128 | 3.2 | 6.3 | 9.6 | 12.4 | 241 |

Tests were carried out similarly at higher temperatures by using a jacketed flask with hot water as the temperature control means. The following results were obtained with silver wire catalyst in the decomposition of 90% hydrogen peroxide at atmospheric pressure.

| Example No. | Temperature, °F. | Ammonium perfluoroalkanoate (F–126) concentration (grams per liter 90 percent $H_2O_2$) | Weight of silver catalyst (grams per 100 grams $H_2O_2$) | Oxygen evolution rate (cc. per second per gram catalyst) corrected for background decomposition in absence of catalyst |
|---|---|---|---|---|
| V | 68 | None | 0.00581 | 21.5 |
| VI | 68 | 0.05 | .00633 | 114 |
| VII | 212 | None | .00673 | 38.5 |
| VIII | 212 | 0.05 | .00651 | 90 |

The successful results with these additives can be contrasted with those obtained with the corresponding unfluorinated acids and salts. At approximately the same molar concentration ($2.3 \times 10^{-4}$ moles per liter) which gave such excellent decomposition when ammonium perfluorocaprylate was used as promoter, the silver decomposition catalyst was poisoned when ammonium n-caprylate was substituted. At a concentration of 0.003 gram or $0.2 \times 10^{-4}$ moles per liter, the ammonium n-caprylate was without effect on the decomposition. A large decrease in the decomposition rate of 90% hydrogen peroxide on silver was noted when 50 to 200 mgs. per liter of malonic, citric or adipic acid was added.

Similar improved hydrogen peroxide decomposition rates can be obtained by substituting for the ammonium perfluoroalkanoates used in the foregoing tests, free perfluorolauric acid, or sodium perfluoroheptoate, or omega-hydroperfluorocaproic acid or ammonium omega-hydroperfluoromyristate. Perfluorocaproic anhydride, perfluorooctylglutaric anhydride, perfluoroenanthyl fluoride, 12-hydroperfluoropalmityl chloride, perfluorocapryl amide, N-trifluoromethylperfluorovaleramide, and omega-hydroperfluorolauramide, are other examples of polar perfluoro compounds which can be used in the same way to promote the silver-catalyzed decomposition of hydrogen peroxide. Other examples of decomposition promoters which can be used similarly with success in the invention are perfluoroisoamyl amine, N-perfluoromethyl-N-perfluorohexyl amine, omega-hydroperfluorooctyl amine, tri (trifluoromethyl) perfluorododecyl ammonium chloride, dodecafluoro-1-heptanol $H(CF_2)_6CH_2OH$, hexadecafluoro-1-nonanol, eicosafluoro-1-undecanol, octacosofluoro-2-tetradecanol and bis(perfluoroheptyl) methane. Still other soluble polar perfluoro- and monohydroperfluoro- compounds can likewise be used, especially advantageous compounds being the saturated compounds of the formula $X—C_nF2n—Y$ where X represents a fluorine or hydrogen atom, Y is a polar group, for instance hydroxyl, hydroxymethyl, amino, including perfluoroalkylamino and quarternary ammonium groups, carbonyl of the structure

where Z is hydroxyl, amino, or

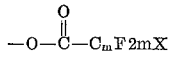

and $n$ and $m$ are integers having values respectively of 5 to 18 and zero to 18.

Examples of fluoro-chloro-polar compounds which can be used in the same way to promote the hydrogen peroxide decomposition are 2,4-dichloro-2,3,3,4,5,5-hexafluoropentanol - 1; 2,4,6,8-tetrachloro-2,3,3,4,5,5,6,7,7,8,9,9-dodecafluorononanol-1; 2,4,6 - trichloro-2,3,3,4,5,5,6,7,7,7-decafluoroheptanoic acid; ammonium 2,4,6,8,10-pentachloro - 2,3,3,4,5,5,6,7,7,8,9,9,10,11,11,11 - hexadecafluoroundecanoate; 1,3,5,7 - tetrachloro - 1,2,2,3,4,4,5,6,6,7,8,8,8 - tridecylfluoro-octyl amine; N-(monochloroperfluoroethyl)-N-(1,3,5 - trichloro - 1,2,2,3,4,4,5,6,6,6 - decafluorohexyl)amine; and 2,4,6 - trichloro - 2,3,3,4,5,5,6,7,7,8,8 - undecafluorocaprylic amide. Other examples of fluoro-chloro-carboxylic acids useful in the invention are those of 4 to 18 carbon atoms sold under the trade name "Kel-F" acids.

The amount of the polar highly fluorinated compound which it will be most advantageous to use with the hydrogen peroxide in the invention, can be varied. As a general rule less will be required the greater the number of carbon atoms per molecule therein. Preferably about $0.3 \times 10^{-4}$ to about $4.6 \times 10^{-4}$ moles and more advantageously about $1 \times 10^{-4}$ to about $3.5 \times 10^{-4}$ moles per liter of the hydrogen peroxide solution being decomposed of highly fluorinated polar organic compounds having chains of 8 carbon atoms are used, and these concentration limits will be decreased by a factor of two for each additional carbon atom in the chain and similarly increased for each carbon atom by which the chain length is decreased. Thus, with a highly fluorinated promoter having 4 carbon atoms the amount will preferably be in the range of about $0.5 \times 10^{-3}$ to about $7 \times 10^{-3}$ moles per liter while with a highly fluorinated polar compound of 18 carbon atoms per molecule the range will generally be about $0.3 \times 10^{-7}$ to about $5 \times 10^{-7}$ moles per liter.

The highly fluorinated polar promoters of hydrogen peroxide decomposition can be added to the peroxide as such or, less preferably, in the form of their progenitors which are converted to the promoters in the hydrogen peroxide which is to be decomposed. It will therefore be understood that the invention is not limited to the modifications of the new process which have been given by way of example nor by any theory proposed in explanation of the improved results which are obtained.

We claim as our invention:

1. In a method for decomposing hydrogen peroxide by contacting the hydrogen peroxide with a solid metallic silver-containing decomposition catalyst, the improvement which comprises effecting the contact of the peroxide with said catalyst in the presence of a soluble polar compound having a dipole moment equal to at least one Debye unit and containing a halogenated hydrocarbon chain of at least four carbon atoms in which at least 85% of the hydrogen atoms have been replaced by halogen of the group consisting of fluorine and chlorine, the ratio of fluorine to chlorine atoms being at least three which polar compound is present in an amount of about $0.3 \times 10^{-4}$ to about $4.6 \times 10^{-4}$ moles per liter of hydrogen peroxide when said halogenated chain contains 8 carbon atoms and the amount is decreased when said chain contains more carbon atoms and increased when it contains fewer carbon atoms.

2. In a method for decomposing hydrogen peroxide by contacting the hydrogen peroxide of at least 90% concentration with a solid metallic silver-containing decomposition catalyst, the improvement which comprises effecting the contact of the peroxide with said catalyst in the presence of a soluble polar compound of the group consisting of carboxylic acids, carboxylic acid salts, carboxylic acid anhydrides, carboxylic acid halides, carboxylic acid amides and carbinols having a halogenated hydrocarbon chain of at least four carbon atoms in which at least 85% of the hydrogen atoms have been replaced by halogen of the group consisting of fluorine and chlorine, the ratio of fluorine to chlorine atoms being at least three which polar compound is present in an amount of about $0.3 \times 10^{-4}$ to about $4.6 \times 10^{-4}$ moles per liter of hydrogen peroxide when said halogenated chain contains 8 carbon atoms and the amount is decreased when said chain contains more carbon atoms and increased when it contains fewer carbon atoms.

3. A process in accordance with claim 1 wherein the amount of said additive is about $1 \times 10^{-4}$ to about $3.5 \times 10^{-4}$ moles per liter of hydrogen peroxide solution when said halogenated chain contains 8 carbon atoms and is decreased by a factor of 2 for each additional carbon atom in the chain and increased by a factor of 2 for each carbon atom decrease in chain length.

4. A process in accordance with claim 3 wherein the additive is a salt of a perfluoroalkanoic acid having 5 to 18 carbon atoms per molecule.

5. A process in accordance with claim 3 wherein the additive is ammonium perfluorocaprylate.

6. A process in accordance with claim 3 wherein the additive is a monohydroperfluoroalkanoic acid.

7. An oxidant adapted for use in liquid fuel rocket motors in which hydrogen peroxide is catalytically decomposed by contact with a bed of solid silver catalyst, consisting essentially of aqueous hydrogen peroxide of at least about 90% concentration containing a perfluorocarboxylic acid having 5 to 18 carbon atoms per molecule in an amount of about $0.3 \times 10^{-4}$ to about $4.6 \times 10^{-4}$ moles per liter when said acid contains 8 carbon atoms per molecule and the amount is decreased by a factor of two for each additional carbon atom therein and increased by a factor of two for each additional carbon atom decrease in chain length.

8. An oxidant in accordance with claim 7 wherein the hydrogen peroxide contains a salt of a perfluorocarboxylic acid soluble in the peroxide in an amount between about $0.3 \times 10^{-4}$ to about $4.6 \times 10^{-4}$ moles per liter when said acid contains 8 carbon atoms per molecule and the amount is decreased by a factor of two for each additional carbon atom therein and increased by a factor of two for each additional carbon atom decrease in chain length.

9. Hydrogen peroxide having a high rate of decomposition at low temperatures consisting essentially of hydrogen peroxide of at least about 90% concentration containing an ammonium salt of a perfluoroalkanoic acid of 5 to 18 carbon atoms per molecule, the amount of said salt being about $0.3 \times 10^{-4}$ to about $4.6 \times 10^{-4}$ moles per liter when said acid contains 8 carbon atoms per molecule, said amount being decreased by a factor of two for each additional carbon atom therein and increased by a factor of two for each carbon atom whereby the carbon content of said acid is decreased.

10. Hydrogen peroxide in accordance with claim 9 containing about 0.04 to 0.2 gram per liter of ammonium perfluorocaprylate.

11. Composition consisting essentially of hydrogen peroxide and dissolved salt of monohydroperfluoroalkanoic acid having 5 to 18 carbon atoms per molecule in an amount of about $0.3 \times 10^{-4}$ to about $4.6 \times 10^{-4}$ moles per liter when said acid contains 8 carbon atoms per molecule and the amount is decreased by a factor of two for each additional carbon atom therein and increased by a factor of two for each additional carbon atom decrease in chain length.

12. Composition consisting essentially of hydrogen peroxide and a soluble polar compound having a perfluorocarbon chain of at least four carbon atoms containing not more than one hydrogen atom in an amount of about $0.3 \times 10^{-4}$ to about $4.6 \times 10^{-4}$ moles per liter when said acid contains 8 carbon atoms per molecule, said amount being decreased by a factor of two for each additional carbon atom therein and increased by a factor of two for each carbon atom whereby the carbon content of said acid is decreased effective for promotion of decomposition on contact with a solid silver-containing peroxide decomposition catalyst.

13. Hydrogen peroxide in accordance with claim 12 wherein the polar compound is a perfluoroalcohol having 5 to 18 carbon atoms per molecule.

14. Hydrogen peroxide in accordance with claim 12 wherein the polar compound is a perfluoroamine having a perfluoroalkyl group of 5 to 18 carbon atoms per molecule.

15. Hydrogen peroxide in accordance with claim 12 wherein the polar compound is an amide of a perfluorocarboxylic acid having 5 to 18 carbon atoms per molecule.

References Cited in the file of this patent

UNITED STATES PATENTS

| | | |
|---|---|---|
| 2,721,788 | Schad | Oct. 25, 1955 |
| 2,791,883 | Moore et al. | May 14, 1957 |